United States Patent
Tian et al.

(10) Patent No.: US 10,739,596 B2
(45) Date of Patent: Aug. 11, 2020

(54) DEVICE FOR ADJUSTING DISTANCE BETWEEN LENS TUBE ASSEMBLIES, HEAD-MOUNTED DISPLAY DEVICE AND STEPWISE ADJUSTMENT MECHANISM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenhong Tian, Beijing (CN); Hao Zhang, Beijing (CN); Lili Chen, Beijing (CN); Zhanshan Ma, Beijing (CN); Zhiyu Sun, Beijing (CN); Haoran Jing, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/189,535

(22) Filed: Nov. 13, 2018

(65) Prior Publication Data
US 2019/0285894 A1 Sep. 19, 2019

(30) Foreign Application Priority Data
Mar. 16, 2018 (CN) .......................... 2018 1 0218172

(51) Int. Cl.
*G02B 27/01* (2006.01)

(52) U.S. Cl.
CPC .. *G02B 27/0172* (2013.01); *G02B 2027/0123* (2013.01); *G02B 2027/0134* (2013.01);
(Continued)

(58) Field of Classification Search
CPC .... G02B 2027/0134; G02B 2027/0123; G02B 2027/0138; G02B 2027/0141; G02B 27/0172

See application file for complete search history.

(56) References Cited

U.S. PATENT DOCUMENTS

2003/0206274 A1* 11/2003 Goris ................... A61B 3/0285
351/217
2015/0138645 A1* 5/2015 Yoo ..................... G02B 27/0101
359/630
(Continued)

FOREIGN PATENT DOCUMENTS

CN 203425107 U 2/2014
CN 205003365 U 1/2016
(Continued)

OTHER PUBLICATIONS

First Office Action for Chinese Application No. 201810218172.4, dated Mar. 27, 2020, 10 Pages.

*Primary Examiner* — Christopher E Leiby
(74) *Attorney, Agent, or Firm* — Brooks Kushman P.C.

(57) ABSTRACT

A device for adjusting a distance between lens tube assemblies, a head-mounted display device and a step-wise adjustment mechanism are provided. The device for adjusting the distance between the lens tube assemblies includes: a guide shaft configured to mount two lens tube assemblies, with the two lens tube assemblies slidable toward or away from each other; a pair of racks respectively arranged on the two lens tube assemblies; a pair of dial gears, each of which includes a gear portion engaged with the rack and a dial portion configured to drive the gear portion to rotate under an external force; and a pair of dial gear shafts configured to mount the pair of dial gears to a housing of a head-mounted
(Continued)

display device where the two lens tube assemblies are located, with the dial gear rotatable relative to the dial gear shaft.

20 Claims, 4 Drawing Sheets

(52) U.S. Cl.
CPC ............ *G02B 2027/0138* (2013.01); *G02B 2027/0141* (2013.01)

(56) References Cited

U.S. PATENT DOCUMENTS

2017/0010471 A1* 1/2017 Serrano Canovas ........................ G02B 27/0176
2019/0278088 A1* 9/2019 Asaf .................. G02B 27/0172

FOREIGN PATENT DOCUMENTS

| CN | 205374877 U | 7/2016 |
| DE | 102013216088 A1 | 2/2015 |

* cited by examiner

DEVICE FOR ADJUSTING DISTANCE BETWEEN LENS TUBE ASSEMBLIES, HEAD-MOUNTED DISPLAY DEVICE AND STEPWISE ADJUSTMENT MECHANISM

CROSS-REFERENCE TO RELATED APPLICATION

This application claims priority to Chinese Patent Application No. 201810218172.4 filed on Mar. 16, 2018, the disclosure of which is incorporated in its entirety by reference herein.

TECHNICAL FIELD

The present disclosure relates to the field of head-mounted display device, and in particular to a device for adjusting a distance between lens tube assemblies, a head-mounted display device applying the device for adjusting the distance between the lens tube assemblies, and a stepwise adjustment mechanism applied to the device for adjusting the distance between the lens tube assemblies.

BACKGROUND

With the development of science and technology, virtual display technology is being increasingly used in the productions and lives of people. Specifically, a head-mounted display device (also referred to as a virtual display device) is the most widely used. The head-mounted display device is a three-dimensional display that guides a user to create a feeling of being in a virtual environment based on differences between pieces of information obtained by left and right eyes of the user. The display principle is that screens for the left and right eyes display images to the left and right eyes respectively. The eyes of the user obtain the information with difference, and then the user generates a stereoscopic feeling in his or her mind. When the user wears the head-mounted display device, a virtual world with a strong stereoscopic effect can be viewed.

For head-mounted display devices in related technologies, difficulty in interpupillary distance adjustment needs to be reduced.

SUMMARY

The present disclosure relates to a device for adjusting a distance between lens tube assemblies of a head-mounted display device, which respectively correspond to left and right eyes. The device for adjusting the distance between the lens tube assemblies includes a guide shaft assembly, a pair of racks, a pair of dial gears and a pair of dial gear shafts. The guide shaft assembly includes a guide shaft support and a guide shaft mounted to the guide shaft support. The guide shaft is configured to mount two lens tube assemblies, with the two lens tube assemblies slidable toward or away from each other. The pair of racks is respectively arranged on the two lens tube assemblies. Each dial gear of the pair of dial gears includes a gear portion and a dial portion which are fixed to each other. The gear portions of the pair of dial gears engage with the pair of racks in a one-to-one correspondence. The pair of dial gear shafts is configured to mount the pair of dial gears to a housing of a head-mounted display device where the two lens tube assemblies are located, with the pair of dial gears rotatable relative to the dial gear shafts respectively.

In some possible embodiments of the present disclosure, the device for adjusting the distance between the lens tube assemblies further includes a linkage gear and gear engagement parts, where the gear engagement parts are engaged with the linkage gear and formed on the two lens tube assemblies respectively.

In some possible embodiments of the present disclosure, the device for adjusting the distance between the lens tube assemblies further includes a linkage gear support. A pillar is provided in a middle of the linkage gear support. Receiving openings configured to make space for the lens tube assemblies are respectively provided at two sides of the pillar. The linkage gear is arranged at the pillar and is rotatable relative to the pillar.

In some possible embodiments of the present disclosure, in an axial direction of each dial gear of the pair of the dial gears, an end surface of the each dial gear is provided with an accommodating recess. A pair of extreme position plates which are spaced apart from each other are provided in the accommodating recess. Each dial gear shaft of the pair of dial gear shafts includes a first end and a second end that are opposite to each other in an axial direction of the each dial gear shaft. In a radial direction of the each dial gear shaft away from the each dial gear shaft, the first end extends to form a pair of extending portions. Each extending portion of the pair of extending portions extends toward the second end to form a limiting stopper. The second end of the dial gear shaft extends through the dial gear. The first end is received in the accommodating recess. The limiting stopper is embedded into the accommodating recess, with the extreme position plates of the dial gear rotatable within a range limited by the limiting stoppers.

In some possible embodiments of the present disclosure, a group of grading grooves is provided on an inner side wall of the accommodating recess. An extending portion of the pair of extending portions is connected with a resilient arm extending along a circumferential direction of the dial gear shaft. A limiting protrusion is provided on a side of a tail of the resilient arm facing away from the dial gear shaft. The limiting protrusion is configured to be snapped into the group of grading grooves in a resilient manner.

In some possible embodiments of the present disclosure, there are two groups of the grading grooves, the two groups being respectively located at two ends of the dial gear in a radial direction of the dial gear. Each extending portion of the pair of extending portions is connected with one resilient arm. The two resilient arms each are arc-shaped and concentric with the dial gear shaft, and the limiting protrusion is provided on each of the two resilient arms.

In some possible embodiments of the present disclosure, the device for adjusting the distance between the lens tube assemblies further includes at least one of a pointer or a scale. One of the pointer and the scale is provided on the dial portion, and the other of the pointer and the scale is provided on the housing, to display an adjusted interpupillary distance value.

In some possible embodiments of the present disclosure, an end of the dial gear shaft in an axial direction of the dial gear shaft is configured to extend through the dial gear to be fixed to the housing of the head-mounted display device. The end of dial gear shaft is provided with a positioning slot, and the positioning slot is configured to snap a positioning rib on the housing thereinto.

In some possible embodiments of the present disclosure, the gear portion is made of polycarbonate PC material, and the dial portion is made of thermoplastic polyurethane TPU material.

In some possible embodiments of the present disclosure, a polyline-shaped protrusion is provided on an outer circumference of the dial portion.

In addition, the present disclosure relates to a head-mounted display device which includes a housing, two lens tube assemblies arranged in the housing, and the device for adjusting the distance between the lens tube assemblies as mentioned above. The device for adjusting the distance between the lens tube assemblies is connected with the housing and the lens tube assemblies. Each dial gear shaft of the pair of dial gear shafts is fixed at the housing. The gear portion is located inside the housing and is engaged with the rack on the lens tube assemblies. The dial portion is located outside the housing and is rotatable relative to the housing.

In some possible embodiments of the present disclosure, the head-mounted display device further includes a focal length adjustment device configured to adjust a distance between lens of the lens tube assemblies and the housing in a front-rear direction.

In addition, the present disclosure relates to a stepwise adjustment mechanism which includes a dial gear shaft and a dial gear. The dial gear is sleeved on the dial gear shaft and is rotatable relative to the dial gear shaft. The dial gear includes a gear portion and a dial portion which are fixed to each other. An accommodating recess is formed on an end surface of the dial gear in an axial direction of the dial gear, and a group of grading grooves is provided on an inner side wall of the accommodating recess. The dial gear shaft includes a first end and a second end that are opposite to each other in an axial direction of the dial gear shaft. In a radial direction of the dial gear, the first end extends to form an extending portion. An end of the extending portion is connected with a resilient arm. The resilient arm extends along a circumferential direction of the dial gear shaft. A limiting protrusion is provided on a side of a tail of the resilient arm facing away from the dial gear shaft. The second end extends through the dial gear. The first end is received in the accommodating recess. The limiting protrusion is configured to be snapped into the group of grading grooves a resilient manner when the dial gear rotates.

In some possible embodiments of the present disclosure, the extending portion extends toward the second end to form a limiting stopper. A pair of extreme position plates which are spaced apart from each other is provided in the accommodating recess. The pair of extreme position plates is arranged near a boundary between the gear portion and the dial portion, and the pair of extreme position plates of the dial gear is rotatable within a range limited by the limiting stopper.

BRIEF DESCRIPTION OF THE DRAWINGS

To facilitate understanding of aspects and advantages of the present disclosure, embodiments are described in conjunction with the drawings hereinafter.

DETAILED DESCRIPTION

Figure 1:
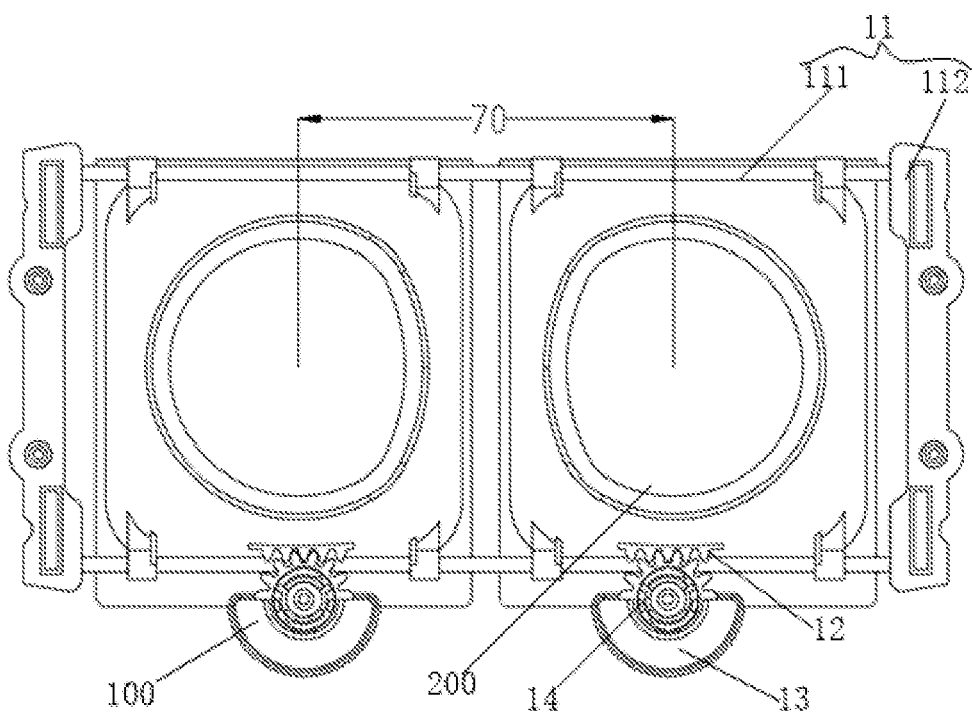
FIG. 1 is a schematic structural view of a device for adjusting a distance between lens tube assemblies assembled with lens tube assemblies according to an embodiment of the present disclosure.

The embodiments of the present disclosure will be described in detail hereinafter. Examples of the embodiments are illustrated in the drawings, where the same or similar reference numerals are used to represent the same or similar elements or elements having the same or similar functions. The embodiments described herein with reference to the drawings are merely exemplary to illustrate the present disclosure and are not to be construed as limit to the present disclosure.

Among head-mounted display devices in the related technologies, there are mainly there types of head-mounted display devices having an interpupillary distance adjustment function, as described hereinafter.

1. A screw type, in which a steel shaft having a left-handed thread and a right-handed thread are cooperated with threads of lens tubes. In this case, interpupillary distance adjustment is implemented by rotating the steel shaft to achieve left and right movement of the two lens tubes. In this type of design, since the steel shaft is thin and the thread pitch is small, the operation of rotating the steel shaft is difficult during adjusting the interpupillary distance, and a value of the interpupillary distance adjustment can not be obtained intuitively.

2. A rack type, in which racks are added to the lens tubes, and the left and right lens tubes each engage with one gear. In this case, interpupillary distance adjustment is implemented by dialing the lens tubes. Such a mechanism is simple and effective, but an operation of adjusting the interpupillary distance can not be performed when wearing the head-mounted display device. Thus, it is inconvenient to use.

3. A belt-wheel type, in which movement of lens tubes is driven by synchronous belt and synchronous wheel. This type of product has poor assembly performance, and does not have a self-locking function after adjustment. Moreover, stagger of teeth may easily occur, and a value of the interpupillary distance adjustment can not be obtained directly.

The present disclosure provides a device for adjusting a distance between lens tube assemblies, a head-mounted display device applying the device for adjusting the distance between the lens tube assemblies, and a stepwise adjustment mechanism applied to the device for adjusting the distance between the lens tube assemblies, to reduce the difficulty in operation of interpupillary distance adjustment.

The present disclosure provides a device for adjusting a distance between lens tube assemblies, which is applicable to a head-mounted display device, to avoid image unsharpness and deformation caused by improper interpupillary distance and to meet the requirements of users with different interpupillary distances. In some possible embodiments of the present disclosure, the device for adjusting the distance between the lens tube assemblies has an interpupillary distance adjustment range from 60 mm to 75 mm, inclusively.

As shown in FIG. 1, the device 100 for adjusting the distance between the lens tube assemblies according to the present disclosure includes a guide shaft assembly 11, a rack 12, a dial gear 13 and a dial gear shaft 14.

The guide shaft assembly 11 may include a guide shaft support 112 and a pair of guide shafts 111 mounted to the guide shaft support 112. The pair of guide shafts 111 may be arranged in parallel in an up-down direction for mounting two lens tube assemblies 200 abreast. The two lens tube assemblies 200 may be slidable toward or away from each other along the pair of guide shafts 111.

Corresponding to the two lens tube assemblies 200, a pair of the racks 12 may be provided, which may be respectively arranged on the two lens tube assemblies 200.

Figure 4:
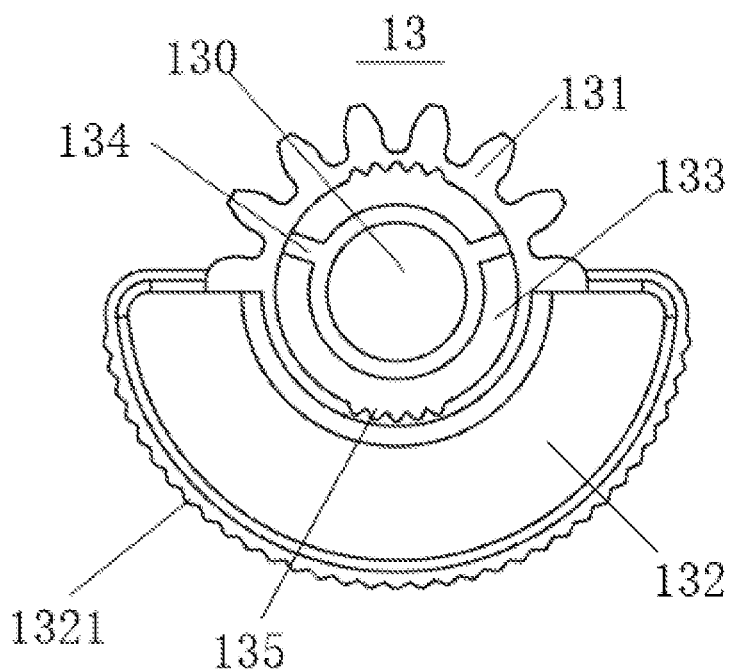
FIG. 4 is a schematic view of an end surface of a dial gear according to an embodiment of the present disclosure.

As shown in FIG. 4, corresponding to the two lens tube assemblies 200, a pair of the dial gears 13 may be provided. A central portion of each dial gear 13 is provided with a through hole 130, such that each dial gear shaft 14 can extend through the through hole 130 to mount the dial gear 13 onto a housing 500 of a head-mounted display device 1000. The dial gear 13 is in clearance-fit with the dial gear shaft 14, such that the dial gear 13 may be rotatable relative to the dial gear shaft 14. Each the dial gear 13 is provided with a gear portion 131 and a dial portion 132 that are fixed to each other at two sides of the dial gear 13 in a radial direction of the dial gear 13. The gear portions 131 of the pair of dial gears 13 engage with the racks 12 in a one-to-one correspondence. The dial portion 132 is configured drive, under the action of an external force, the gear portion 131 to rotate.

Figure 5:
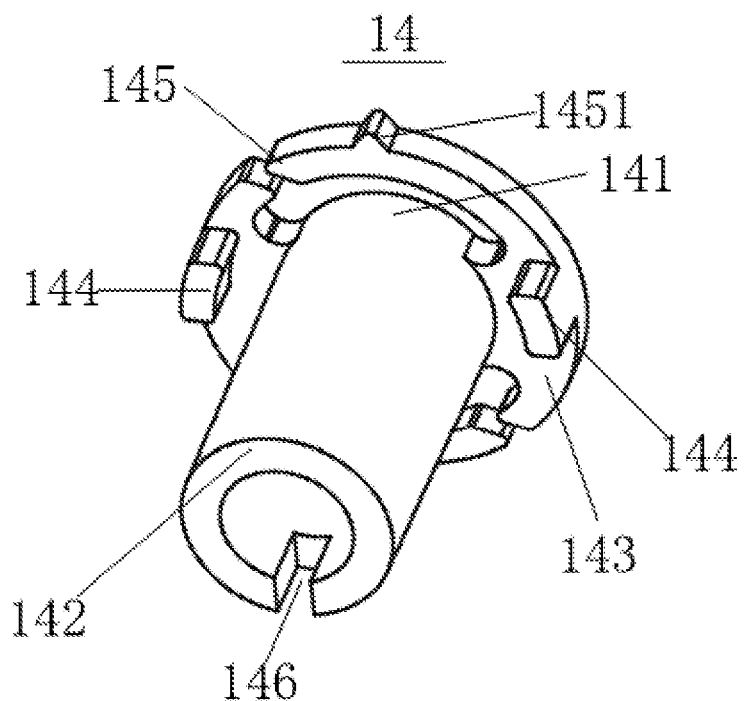
FIG. 5 is a perspective view of a dial gear shaft according to an embodiment of the present disclosure.

As shown in FIG. 5, corresponding to the pair of dial gears 13, a pair of the dial gear shafts 14 may be provided. Each dial gear shaft 14 includes a first end 141 and a second end 142 that are opposite to each other in an axial direction of the dial gear shaft 14. The second end 142 is configured to extends through the through hole 130 of the dial gear 13 and to be fixed to the housing 500. The first end 141 is configured to define an axial distance between the dial gear 13 and the housing 500, to prevent an axial sliding of the dial gear 13 while rotating, thereby ensuring the accuracy of the interpupillary distance adjustment.

Figure 2:
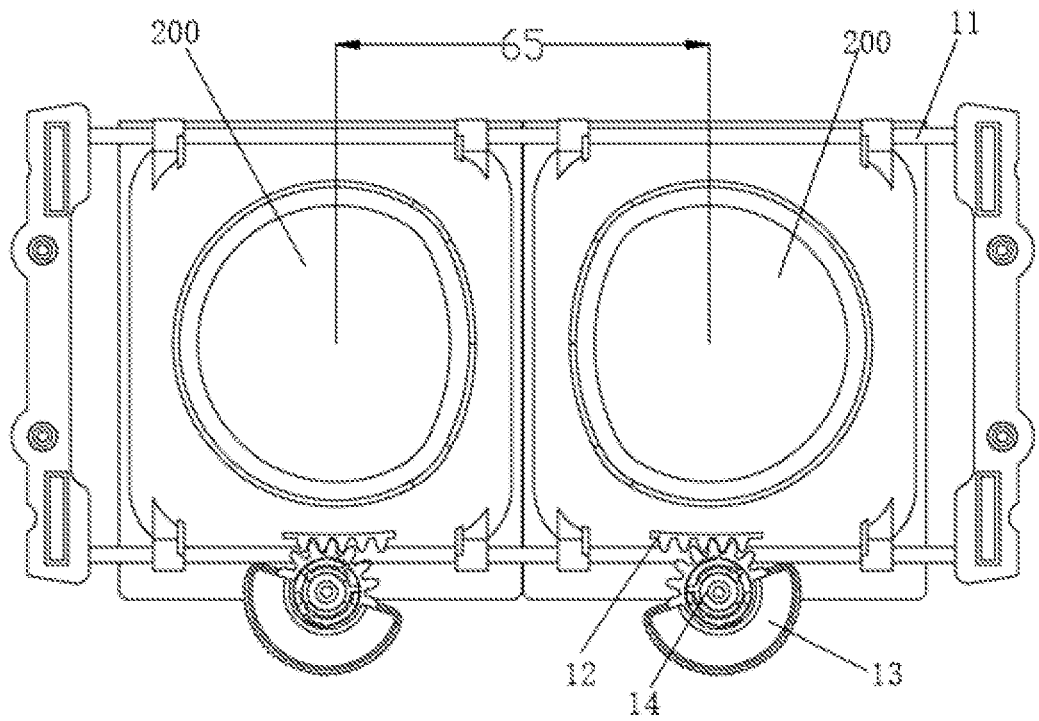
FIG. 2 is a schematic view illustrating a using state of reducing an interpupillary distance using the device for adjusting the distance between the lens tube assemblies shown in FIG. 1.
Figure 3:
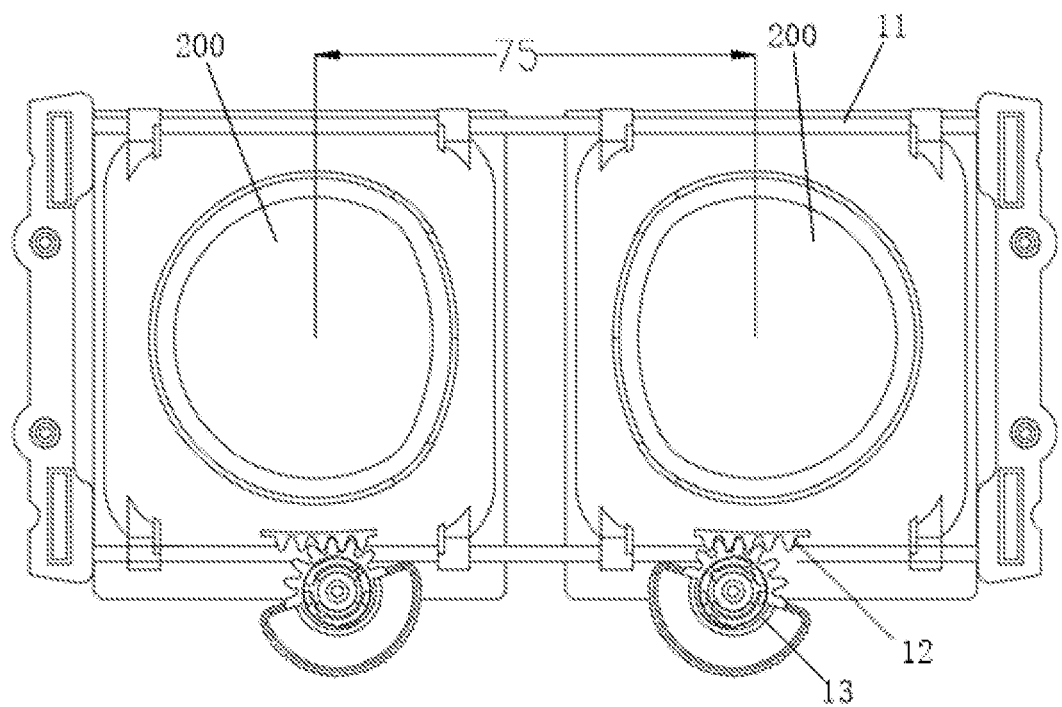
FIG. 3 is a schematic view illustrating a use state of increasing an interpupillary distance using the device for adjusting the distance between the lens tube assemblies shown in FIG. 1.

Reference is made to FIG. 2 and FIG. 3. FIG. 2 shows that the two lens tube assemblies 200 slide toward each other by dialing the dial portion 132 of the dial gear 13, so that the two lens tube assemblies 200 approaches each other. For example, the distance between the two lens tubes are changed from 70 mm to 65 mm, thereby reducing the interpupillary distance. FIG. 3 shows that the two lens tube assemblies 200 slide away from each other by dialing the dial portion 132 of the dial gear 13, so that the two lens tube assemblies 200 leave each other. For example, the distance between the two lens tubes are changed from 70 mm to 75 mm, thereby increasing the interpupillary distance.

In view of the above, in the device 100 for adjusting the distance between the lens tube assemblies according to the present disclosure, the two lens tube assemblies 200 are driven correspondingly by the two shifting gears 13 meshing with the two racks 12 on the lens tube assemblies 200 to slide laterally along the guide shafts 111, so that the two lens tube assemblies 200 are slidable toward or away from each other, thereby achieving interpupillary distance adjustment.

Further, the device 100 for adjusting the distance between the lens tube assemblies may include a linkage mechanism connecting to the two lens tube assemblies 200 respectively, to achieve a linkage between the two lens tube assemblies 200. In this way, when any one of the dial gears 13 is dialed, the two lens tube assemblies 200 slide synchronously to achieve a good centering effect.

Figure 7:
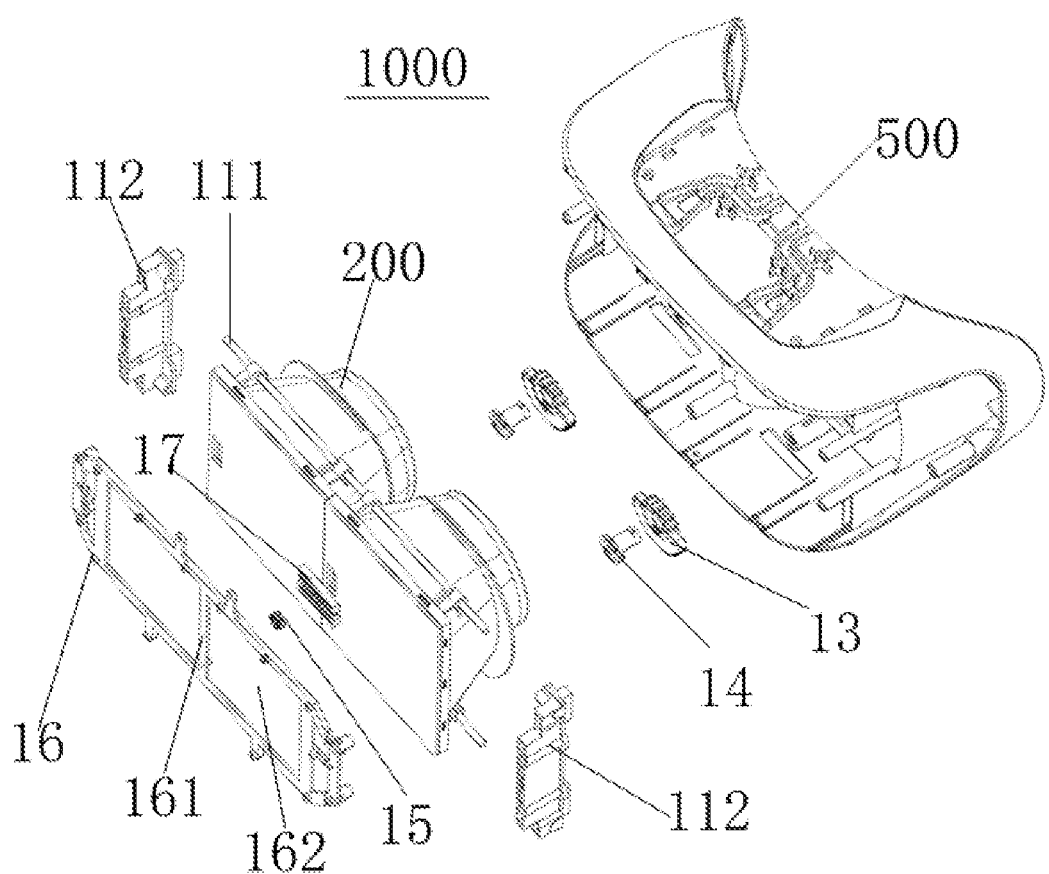
FIG. 7 is an exploded view of a head-mounted display device according to an embodiment of the present disclosure, with a portion of a housing omitted for ease of illustration.

As shown in FIG. 7, in some possible embodiments of the present disclosure, the linkage mechanism may include a linkage gear 15, a linkage gear support 16 and a gear engagement part 17 arranged on the lens tube assemblies 200. The linkage gear support 16 is substantially rectangular, and a pillar 161 extending in a height direction of the linkage gear support 16 is provided in a middle of the linkage gear support 16. The linkage gear 15 is arranged on the pillar 161 and is rotatable relative to the pillar 161. Left and right sides of the pillar 161 each are provided with a receiving opening 162 configured to make space for the lens tube assembly 200 when the linkage gear 15 and the gear engagement part 17 are connected to each other.

Further, the device 100 for adjusting the distance between the lens tube assemblies may include a limiting mechanism for defining a range of the interpupillary distance adjustment and keeping the gear portion 131 meshing with the rack 12.

Figure 6:
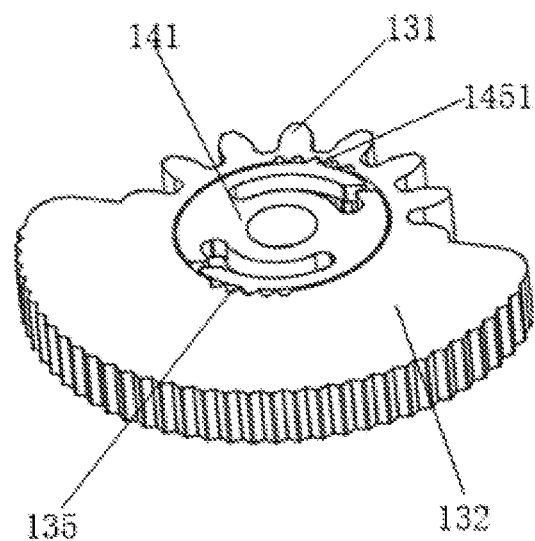
FIG. 6 is a schematic view illustrating the dial gear shown in FIG. 4 assembled with the dial gear shaft shown in FIG. 5.

As shown in FIG. 4 to FIG. 6, in an axial direction of the dial gear, an end surface of the dial gear 13 is provided with an accommodating recess 133. A pair of extreme position plates 134, which are spaced apart from each other, is provided in the accommodating recess 133 at locations corresponding to the gear portion 131. For example, the extreme position plates 134 and the gear portion 131 are located at a same side of a boundary between the dial portion 132 and the gear portion 131. In some possible embodiments of the present disclosure, the extreme position plates 134 are provided near the boundary between the dial portion 132 and the gear portion 131.

In a radial direction of the dial gear shaft away from the dial gear shaft, the first end 141 of the dial gear shaft 14 extends to form a pair of extending portions 143. The extending portions 143 each extend toward the second end 142 to form a limiting stopper 144. The first end 141 is received in the accommodating recess 133, and the extreme position plates 134 may be blocked at a side of the limiting stopper 144 when the dial gear 13 rotates relative to the dial gear shaft 14.

The extreme position plates 134 and the limiting stopper 144 together form the limiting mechanism which defines a maximum angle of rotation of the dial gear 13 relative to the dial gear shaft 14 and defines maximum angles of clockwise rotation and counterclockwise rotation of the gear portion 131. As a result, left and right movement distances of the lens tube assemblies 200 are defined. In addition, the limiting mechanism can prevent separation of the gear portion 131 from the rack 12, ensuring normal operation of the device 100 for adjusting the distance between the lens tube assemblies.

In some possible embodiments of the present disclosure, the device 100 for adjusting the distance between the lens tube assemblies may further include a stepwise adjustment mechanism for achieving stepwise adjustment of the interpupillary distance and a self-locking function.

As shown in FIG. 4 and FIG. 6, in some possible embodiments of the present disclosure, a group of grading grooves 135 is formed on an inner side wall of the accommodating recess 133. The group of grading grooves 135 is provided in accordance with adjusted distances. In other words, angle values of the group of grading grooves 135 correspond to rotation angles of the gear portion 131. For example, different rotation angels of the gear portion 131 and different locations on the group of grading grooves 135 are associated with each other in a one-to-one correspondence.

As shown in FIG. 5 and FIG. 6, the extending portions 143 of the dial gear shaft 14 are connected with resilient arms 145. The resilient arms 145 extend along a circumferential direction of the first end 141. And there are gaps between the resilient arms 145 and the first end 141. A side of a tail of the resilient arm 145 facing away from the dial gear shaft 14 is provided with a limiting protrusion 1451. The limiting protrusion 1451 may be resiliently snapped into the group of grading grooves 135 when the dial gear 13 rotates relative to the dial gear shaft 14, and the limiting protrusion 1451 has no relative displacement with the inner side wall of the dial gear 13 when the external force disappears. In other words, a relative position between the dial gear 13 and the rack 12 of the lens tube assembly 200 is locked by the resilient arm 145 without displacement or offset. Therefore, the stepwise adjustment mechanism can maintain the adjusted angle and achieve a self-locking function.

It should be understood that the tail of the resilient arm described herein is a portion of the resilient arm 145 except the portion fixed to the extending portion, and is not limited to an end portion of the resilient arm. That is, the limiting protrusion 1451 may also be provided near a middle position of the resilient arms 145, which can be specifically set by those skilled in the art in accordance with requirement of the resilient force.

It can be seen that, on the basis of the dial gear 13 and the dial gear shaft 14, the group of grading grooves 135 and the resilient arms 145 with the limiting protrusions 1451 are provided correspondingly. The stepwise adjustment and self-locking function of the present disclosure can be achieved based on the relative position relationship between the limiting protrusion 1451 and the group of grading grooves 135. In other words, the dial gear 13 with the group of grading grooves 135 and the dial gear shaft 14 with the resilient arms 145 can together form the stepwise adjustment mechanism for achieving the stepwise adjustment and self-locking function.

In some possible embodiments of the present disclosure, there are two groups of the grading grooves 135, which are respectively arranged at positions corresponding to the gear portion 131 and the dial portion 132 and are respectively located at two ends of the dial gear 13 in a radial direction of the dial gear 13. For example, the two groups of the grading grooves 135 are respectively located at two side of the boundary between the e dial portion 132 and the gear portion 131. Each of the extending portions 143 of the dial gear shaft 14 is connected with one resilient arm 145. The two resilient arms 145 are arc-shaped and concentric with the dial gear shaft 14. Each of the resilient arms 145 is provided with a limiting protrusion 1451.

In some possible embodiments of the present disclosure, the limiting stoppers 144, the resilient arms 145 and the limiting protrusions 1451 are integrally formed with the dial gear shaft 14. The extreme position plates 134 are integrally formed with the dial gear 13.

In some possible embodiments of the present disclosure, the second end 142 of the dial gear shaft 14 is provided with a positioning slot 146, so that a positioning rib provided on the housing 500 can be snapped into the positioning slot 146 when the dial gear shaft 14 is mounted on the housing 500. The positioning slot 146 prevents the dial gear shaft 14 from rotating relative to the housing 500.

In some possible embodiments of the present disclosure, the gear portion 131 is made of polycarbonate PC material. The dial portion 132 is made of thermoplastic polyurethane TPU material.

In some possible embodiments of the present disclosure, during processing of components, the gear portion 131 of the dial gear 13 is integrally stamped with the dial portion 132 to enhance the firmness of the connection between the gear portion 131 and the dial portion 132, thereby preventing the rotation of the gear portion 131 relative to the dial portion 132 due to the looseness of the connection. In other embodiments, the gear portion 131 and the dial portion 132 are two separate components, which may be fixed to each other by means of gluing, fusing, welding or snapping.

In some possible embodiments of the present disclosure, a polyline-shaped protrusion 1321 is provided on an outer circumference of the dial portion 132 to increase the friction force between the dial portion 132 and user's finger, thereby facilitating the operation of interpupillary distance adjustment for the user and achieving a labor-saving effect.

In some possible embodiments of the present disclosure, a pointer corresponding to the limiting protrusion 1451 is provided on the dial portion 132, so that the pointer can coordinate with a scale value of a scale on the housing provided corresponding to the group of grading grooves 135, to display an interpupillary distance value after adjusting the interpupillary distance, thereby quantifying the interpupillary distance adjustment stepwise and achieving visualization of the interpupillary distance adjustment. For example, the position indicated by the pointer is changed with the movement of the limiting protrusion 1451, and different scale values of the scale are associated with different positions on the group of grading grooves 135 in a one-to-one correspondence.

In another embodiment, the pointer is provided on the housing 500, and the scale is formed on the dial portion 132, which also achieves the purpose of the visualization of the interpupillary distance adjustment.

The pointer may be in a shape of a dot or an arrow, which may be convexly arranged on the dial portion 132 or the housing 500, or may also be printed on the dial portion 132 or the housing 500. The scale may include at least one of: scale marks or scale values.

In addition, as shown in FIG. 7, the present disclosure further provides a head-mounted display device 1000, which includes the housing 500, two lens tube assemblies 200 arranged in the housing 500, and the device 100 for adjusting the distance between lens tube assemblies arranged on the housing 500 and connected to the lens tube assemblies 200.

The housing 500 is provided with the positioning rib configured to be snapped into the positioning slot 146 of the second end 142 of the dial gear shaft 14, thereby facilitating the installation of the dial gear shaft 14 and the housing 500. Moreover, the positioning rib limits the dial gear shaft 14 to prevent the rotation of dial gear shaft 14 relative to the housing 500 when the dial gear 13 rotates relative to the dial gear shaft 14.

When the dial gear 13 are arranged on the housing 500, the gear portion 131 is positioned inside the housing 500 to mesh with the rack 12 on the lens tube assembly 200, the dial portion 132 is positioned outside the housing 500, and the gear portion 131 and the dial portion 132 are rotatable relative to the housing 500.

In some possible embodiments of the present disclosure, the head-mounted display device 1000 may further include a focal length adjustment device configured to adjust a distance between lens in the lens tube assemblies 200 and the housing 500 in a front-rear direction, i.e., adjusting a distance between the lens and human eyes, to be suitable for people with different visions.

It should be understood that, in order to achieve the visualization of the interpupillary distance adjustment, when the dial portion 132 is provided with the pointer, the housing 500 is provided with the scale and the scale values on the scale are set corresponding to the group of grading grooves 135. When the dial portion 132 is provided with the scale, the housing 500 is provided with pointer corresponding to the limiting protrusion 1451. In this way, the adjusted interpupillary distance can be displayed by means of coordination of the pointer and the scale, to achieve the visualization of interpupillary distance adjustment.

In addition, the stepwise adjustment mechanism of the above examples can also be applied to household products, office equipment, and small machines, to achieve stepwise fine adjustment of distance or angle, and self-locking function after the adjustment.

Compared with the solutions in the related technologies, the solutions in the embodiments of the present disclosure have at least the following advantages.

1. In the device for adjusting the distance between the lens tube assemblies according to the present disclosure, the two dial gears are provided corresponding the two lens tube assemblies, so that the two lens tubes are driven to be close to or away from each other by the two dial gears. In this way, interpupillary distance adjustment is achieved, which enables a head-mounted display device applying the device for adjusting the distance between the lens tube assemblies to be suitable for users with different interpupillary distances. During interpupillary distance adjustment, a user merely needs to dial the dial portion of the dial gear to adjust an interpupillary distance. Moreover, high transmission sensitivity is achieved as the gear portion meshes with the rack in the device for adjusting the distance between the lens tube assemblies, thereby reducing operation difficulty of the interpupillary distance adjustment.

2. In the device for adjusting the distance between the lens tube assemblies according to the present disclosure, the linkage mechanism, i.e., the linkage gear and the gear engagement parts, is further provided to achieve linkage between the two lens tube assemblies. During the interpupillary distance adjustment, synchronous movement (approaching or leaving each other) of the two lens tube assemblies may be achieved by dialing any one of the dial gears, which enhances the centering effect of the interpupillary distance adjustment.

3. In the device for adjusting the distance between the lens tube assemblies according to the present disclosure, the stepwise mechanism is further provided. During the interpupillary distance adjustment, the dial gear rotates relative to the dial gear shaft, and the limiting protrusion of the resilient arm is snapped into a groove of the group of grading grooves in accordance with a currently adjusted angle. After the external force disappears, the limiting protrusion of the resilient arm has no relative displacement with respect to the dial gear, and the position of the dial gear is locked. In this way, the adjusted angle is maintained and a self-locking function is achieved.

The above are merely some embodiments of the present disclosure. It should be noted that those skilled in the art may make further modifications and improvements without departing from the principle of the present disclosure. These modifications and improvements shall also fall within the protection scope of the present disclosure.

What is claimed is:

1. A device for adjusting a distance between lens tube assemblies, comprising:
a guide shaft assembly, a pair of racks, a pair of dial gears, and a pair of dial gear shafts;
wherein the guide shaft assembly comprises a guide shaft support and a guide shaft mounted to the guide shaft support, and the guide shaft is configured to mount two lens tube assemblies, with the two lens tube assemblies slidable on the guide shaft and the two lens tube assemblies slidable toward or away from each other;
wherein the pair of racks is respectively arrangeable on the two lens tube assemblies;
wherein each dial gear of the pair of dial gears comprises a gear portion and a dial portion which are fixed to each other, and the gear portions of the pair of dial gears engage with the pair of racks in a one-to-one correspondence; and
wherein the pair of dial gear shafts is configured to mount the pair of dial gears to a housing of a head-mounted display device where the two lens tube assemblies are located, with the pair of the dial gears rotatable relative to the pair of dial gear shafts respectively.

2. The device according to claim 1, further comprising a linkage gear and gear engagement parts, wherein the gear engagement parts are engaged with the linkage gear and arrangeable on the two lens tube assemblies respectively.

3. The device according to claim 2, further comprising a linkage gear support, wherein a pillar is provided in a middle of the linkage gear support, receiving openings configured to make space for the lens tube assemblies are respectively provided at two sides of the pillar, and the linkage gear is arranged at the pillar and is rotatable relative to the pillar.

4. The device according to claim 1, wherein in an axial direction of each dial gear of the pair of the dial gears, an end surface of the dial gear is provided with an accommodating recess, and wherein a pair of extreme position plates which are spaced apart from each other are provided in the accommodating recess;
wherein each dial gear shaft of the pair of dial gear shafts comprises a first end and a second end that are opposite to each other in an axial direction of the dial gear shaft, wherein in a radial direction of the dial gear shaft away from the dial gear shaft, the first end extends to form a pair of extending portions, and wherein each extending portion of the pair of extending portions extends toward the second end to form a limiting stopper; and
wherein the second end of the dial gear shaft extends through the dial gear, the first end is received in the accommodating recess, and the limiting stopper is embedded into the accommodating recess, with the pair of extreme position plates of the dial gear rotatable within a range limited by the limiting stoppers.

5. The device according to claim 4, wherein a group of grading grooves is provided on an inner side wall of the accommodating recess;
wherein an extending portion of the pair of extending portions is connected with a resilient arm extending along a circumferential direction of the dial gear shaft, a limiting protrusion is provided on a side of a tail of the resilient arm facing away from the dial gear shaft, and the limiting protrusion is configured to be snapped into the group of grading grooves in a resilient manner.

6. The device according to claim 5, wherein there are two groups of the grading grooves, the two groups respectively being located at two ends of the dial gear in a radial direction of the dial gear; and wherein each extending portion of the pair of extending portions is connected with one resilient arm, the two resilient arms each are arc-shaped and concentric with the dial gear shaft, and the limiting protrusion is provided on each of the two resilient arms.

7. The device according to claim 5, further comprising at least one of a pointer or a scale, wherein one of the pointer and the scale is provided on the dial portion, and the other of the pointer and the scale is provided on the housing, to display an adjusted interpupillary distance value.

8. The device according to claim 6, further comprising at least one of a pointer or a scale, wherein one of the pointer and the scale is provided on the dial portion, and the other of the pointer and the scale is provided on the housing, to display an adjusted interpupillary distance value.

9. The device according to claim 1, wherein an end of the dial gear shaft in an axial direction of the dial gear shaft is configured to extend through the dial gear to be fixed to the housing of the head-mounted display device, the end of the dial gear shaft is provided with a positioning slot, and the positioning slot is configured to snap a positioning rib on the housing thereinto.

10. The device according to claim 1, wherein the gear portion is made of polycarbonate (PC) material, and the dial portion is made of thermoplastic polyurethane (TPU) material.

11. The device according to claim 1, wherein a polyline-shaped protrusion is provided on an outer circumference of the dial portion.

12. A head-mounted display device, comprising: a housing, two lens tube assemblies arranged in the housing, and the device for adjusting the distance between the lens tube assemblies according to claim 1, wherein the device for adjusting the distance between the lens tube assemblies is connected with the housing and the lens tube assemblies, each dial gear shaft of the pair of dial gear shafts is fixed at the housing, the gear portion is located inside the housing and is engaged with the rack on the lens tube assembly, and the dial portion is located outside the housing and is rotatable relative to the housing.

13. The head-mounted display device according to claim 12, further comprising a focal length adjustment device configured to adjust a distance between lenses of the lens tube assemblies and the housing in a front-rear direction.

14. The head-mounted display device according to claim 12, wherein in an axial direction of each dial gear of the pair of the dial gears, an end surface of the dial gear is provided with an accommodating recess, and wherein a pair of extreme position plates which are spaced apart from each other are provided in the accommodating recess;

wherein each dial gear shaft of the pair of dial gear shafts comprises a first end and a second end that are opposite to each other in an axial direction of the each dial gear shaft, wherein in a radial direction of the each dial gear shaft away from the each dial gear shaft, the first end extends to form a pair of extending portions, and wherein each extending portion of the pair of extending portions extends toward the second end to form a limiting stopper; and wherein the second end of the dial gear shaft extends through the dial gear, the first end is received in the accommodating recess, and the limiting stopper is embedded into the accommodating recess, with the pair of extreme position plates of the dial gear rotatable within a range limited by the limiting stoppers.

15. The head-mounted display device according to claim 14, wherein a group of grading grooves is provided on an inner side wall of the accommodating recess; and wherein an extending portion of the pair of extending portions is connected with a resilient arm extending along a circumferential direction of the dial gear shaft, a limiting protrusion is provided on a side of a tail of the resilient arm facing away from the dial gear shaft, and the limiting protrusion is configured to be snapped into the group of grading grooves in a resilient manner.

16. The head-mounted display device according to claim 15, wherein there are two groups of the grading grooves, the two groups respectively being located at two ends of the dial gear in a radial direction of the dial gear; and wherein each extending portion of the pair of extending portions is connected with one resilient arm, the two resilient arms each are arc-shaped and concentric with the dial gear shaft, and the limiting protrusion is provided on each of the two resilient arms.

17. The head-mounted display device according to claim 15, wherein the device for adjusting the distance between the lens tube assemblies further comprises at least one of a pointer or a scale, wherein one of the pointer and the scale is provided on the dial portion, and the other of the pointer and the scale is provided on the housing, to display an adjusted interpupillary distance value.

18. The head-mounted display device according to claim 12, wherein an end of the dial gear shaft in an axial direction of the dial gear shaft is configured to extend through the dial gear to be fixed to the housing of the head-mounted display device, the end of dial gear shaft is provided with a positioning slot, and the positioning slot is configured to snap a positioning rib on the housing thereinto.

19. A stepwise adjustment mechanism, comprising: a dial gear shaft and a dial gear, wherein the dial gear is sleeved on the dial gear shaft and is rotatable relative to the dial gear shaft;

wherein the dial gear comprises a gear portion and a dial portion which are fixed to each other, an accommodating recess is formed on an end surface of the dial gear in an axial direction of the dial gear, and a group of grading grooves is provided on an inner side wall of the accommodating recess;

wherein the dial gear shaft comprises a first end and a second end that are opposite to each other in an axial direction of the dial gear shaft, wherein in a radial direction of the dial gear, the first end extends to form an extending portion, wherein an end of the extending portion is connected with a resilient arm, the resilient arm extends along a circumferential direction of the dial gear shaft, and a limiting protrusion is provided on a side of a tail of the resilient arm facing away from the dial gear shaft; and wherein the second end extends through the dial gear, the first end is received in the accommodating recess, and the limiting protrusion is configured to be snapped into the group of grading grooves in a resilient manner when the dial gear rotates.

20. The stepwise adjustment mechanism according to claim 19, wherein the extending portion extends toward the second end to form a limiting stopper; and wherein a pair of extreme position plates which are spaced apart from each other is provided in the accommodating recess, the pair of extreme position plates is arranged near a boundary between the gear portion and the dial portion, and the pair of extreme position plates of the dial gear is rotatable within a range limited by the limiting stopper.

* * * * *